United States Patent [19]

Williams et al.

[11] 3,780,965

[45] Dec. 25, 1973

[54] TAPE RECORDER

[75] Inventors: Norman L. Williams, Villa Park; Allen L. Ryan, Chicago, both of Ill.

[73] Assignee: Warwick Electronics Inc., Chicago, Ill.

[22] Filed: Mar. 22, 1971

[21] Appl. No.: 126,914

Related U.S. Application Data

[62] Division of Ser. No. 666,739, Sept. 11, 1967, Pat. No. 3,606,202.

[52] U.S. Cl. .................................................. 242/204
[51] Int. Cl. .......................................... G11b 15/22
[58] Field of Search.................... 242/204, 201, 202, 242/203, 208, 207, 210, 54.1, 209, 206

[56] References Cited

UNITED STATES PATENTS

| | | | |
|---|---|---|---|
| 3,085,759 | 4/1963 | Guest | 242/204 X |
| 3,093,335 | 6/1963 | Lane | 242/204 |
| 3,448,940 | 6/1969 | Atsumi | 242/204 |
| 2,686,637 | 8/1954 | Dashiell et al. | 242/204 |
| 2,920,148 | 1/1960 | Munroe | 242/208 X |
| 3,093,334 | 6/1963 | Andrews | 242/201 X |
| 3,009,663 | 11/1961 | Armstead | 242/201 |

*Primary Examiner*—George F. Mautz
*Attorney*—Hofgren, Wegner, Allen, Stellman & McCord

[57] ABSTRACT

A two directional tape recorder apparatus having means for automatically threading tape from a supply reel to a take-up reel; means for effecting record, erase, and playback functions in either direction of movement of the tape; means for automatically reversing the direction of movement of the tape; and means for shifting transducing heads into operative association with different tracks on the tape during tape reversal. A scissors brake mechanism is provided for stopping supply and take-up turntables and to release the turntables for rotation during wind, rewind, fast wind and fast rewind operations; and a single control is provided to actuate separate slide members for selecting wind and rewind, and fast wind and fast rewind functions, with means being provided for shifting tape away from the transducing heads during fast wind and fast rewind functions.

5 Claims, 15 Drawing Figures

TAPE RECORDER

This is a division of application Ser. No. 666,739, filed Sept. 11, 1967, now U.S. Pat. No. 3,606,202.

BACKGROUND OF THE INVENTION

This invention relates to tape recorders, and more particularly to two directional tape recorders having record, erase, and playback functions in both directions of movement of the tape. In the past, two direction tape recorders have been well known, but such devices have in general not functioned satisfactorily because they have employed cumbersome and expensive mechanisms to effect the change in direction of tape movement, which have proven to be unreliable in use. One of the more serious problems of prior art devices is in the provision of a suitable means for shifting the transducing heads of the tape recorder with respect to the magnetic tape, so that the transducing heads will be positioned in proper scanning relationship with respect to further tracks on the tape when the direction of tape movement is reversed.

The present invention also relates to a tape recorder having improved means for automatically threading tape from a supply reel to a take-up reel. In the past, such structures have been proposed to obviate the necessity of manually threading the tape, which has proven to be a troublesome task for non-automatic tape recording machines. However, automatic tape threading devices have not met with wide commercial acceptance, because of their initial high cost, and their failure to consistently and reliably feed tape from a supply station to a take-up station.

Another problem of prior art tape recorders is that of providing appropriate brake means for normally retaining supply and take-up turntables against rotation, and for rapidly stopping such turntables when wind and rewind functions have been terminated. A related problem has been the provision of a suitable control mechanism for actuating the brake means in response to selection of a desired tape recorder function, and in the past, tape recorder control mechanisms have included complicated linkages which have not only proven to be unreliable but which have also been proven to be expensive to manufacture and maintain.

The control means of prior art recorders have many other problems in addition to those mentioned above, most of which result from complex and unreliable mechanisms, and such problems are in the area of pressure roller shifting mechanisms, automatic shut off mechanisms, and speed change mechanisms.

Still another problem that has been present in the use of known tape recording machines is that of placement of tape supply and tape take-up reels or cartridges on the tape recorder supply and take-up turntables. In the past, the spindles associated with such turntables have included a plurality of radially outwardly extending ribs that are received within radially extending notches in the reel or cartridge, and difficulty has been encountered in adjusting the reel or cartridge so that the ribs and notches are aligned to enable placement of the reels or cartridges upon the spindles. Furthermore, in tape recording devices wherein the deck or chassis of the device is to be disposed in a near vertical position, such prior art arrangements have not provided satisfactory means for positively retaining the reels or cartridges upon the turntables.

SUMMARY OF THE INVENTION

The two direction tape recorder of the present invention solves the problems noted above by providing a simplified means for sensing indicia on the tape regarding reversal of the direction of the tape movement, and further simplified means responsive to said sensing means for actuating means to effect the reversal of direction of tape movement. The means responsive to the tape indicia sensing means includes a novel one revolution mechanism that is driven by a tape advancing capstan to shift a portion of the tape recorder control means and thereby effect reversal of the direction of tape movement. The control means includes a further simplified arrangement for effecting a vertical shift of the transducing heads into proper operative association with the tape, when the control means is actuated by the one revolution mechanism.

The control means of the present invention includes a novel dual slide arrangement, with one slide controlling automatic tape feed, wind, and rewind functions; and the other slide controlling fast wind and fast rewind functions. The control means further includes a single actuating member in the form of a control shaft movable transversely with respect to the direction of movement of the slides, for separately actuating the slides to control their various functions.

The present invention further includes a novel scissors brake mechanism, including a pair of crossed brake arm members pivotally connected to one another and to the chassis of the machine, with the brake arms being positioned to be engaged by either of the above mentioned slides upon movement thereof to select a desired function, whereby the brake arms are moved to positions allowing the tape supply and take-up turntables to be rotated. When either of the slides is moved to a "Stop" position, the brake arms are moved into operative braking engagement with the tape supply and tape take-up turntables.

Another feature of the control system of the present invention is the provision of a novel and simplified means operated by the fast wind - fast rewind controlling slide for shifting the tape relative to the transducing heads to minimize friction between the tape and the heads during fast wind and fast rewind functions. The control system of the present invention further includes novel detent means for releasably retaining the function controlling slides in their selected positions, and each of the slides includes novel means for bringing drive means into engagement with the tape supply and take take-up turntables when the brake means therefor are released. The fast wind - fast rewind slide of the dual slide control system includes further novel means for shifting the drive means to different elevations relative to a motor drive means, so that the tape supply and tape take-up turntables can be rotated at a rapid rate. The wind - rewind slide of the dual slide control system includes novel means for allowing pressure roller means to move into operative engagement with tape advancing capstan means, when wind or rewind functions have been selected. The control system further includes a unique arrangement for positioning an end of tape sensing member in proper operative relation with respect to the tape path, when various tape recorder functions are selected.

Still another feature of the present invention is the provision of a novel reel or cartridge holddown and keying mechanism which obviates the necessity of providing a plurality of radial ribs on the turntable spindles, so that tape supply and take-up reels or cartridges can be placed on the turntables without the necessity of aligning notches in the reels or cartridges with projections on the spindles. In the arrangement of the present invention, novel means positively holds the tape reels or cartridges on the turntables, even if the tape recorder is substantially vertically disposed. Still further, the structure of the present invention provides an arrangement wherein a uniquely shaped retention member can be moved into a reel or cartridge retaining position, and will automatically move into a keying or driving relationship with respect to a reel or cartridge when the turntable and spindle are rotated.

DESCRIPTION OF THE PREFERRED EMBODIMENT

Figure 1:
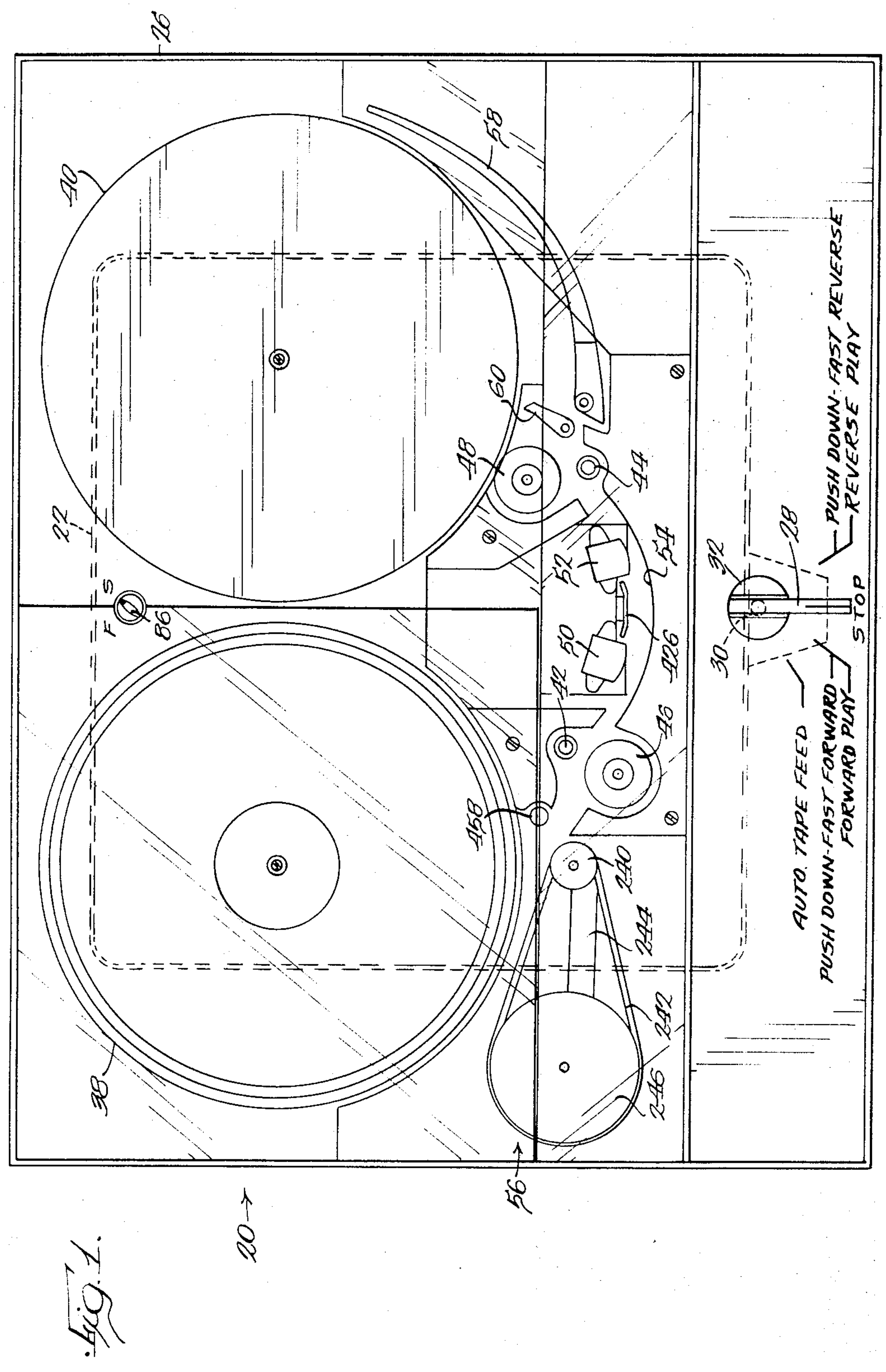
FIG. 1 is a top plan view of a preferred embodiment of the tape recorder of the present invention.
Figure 2:
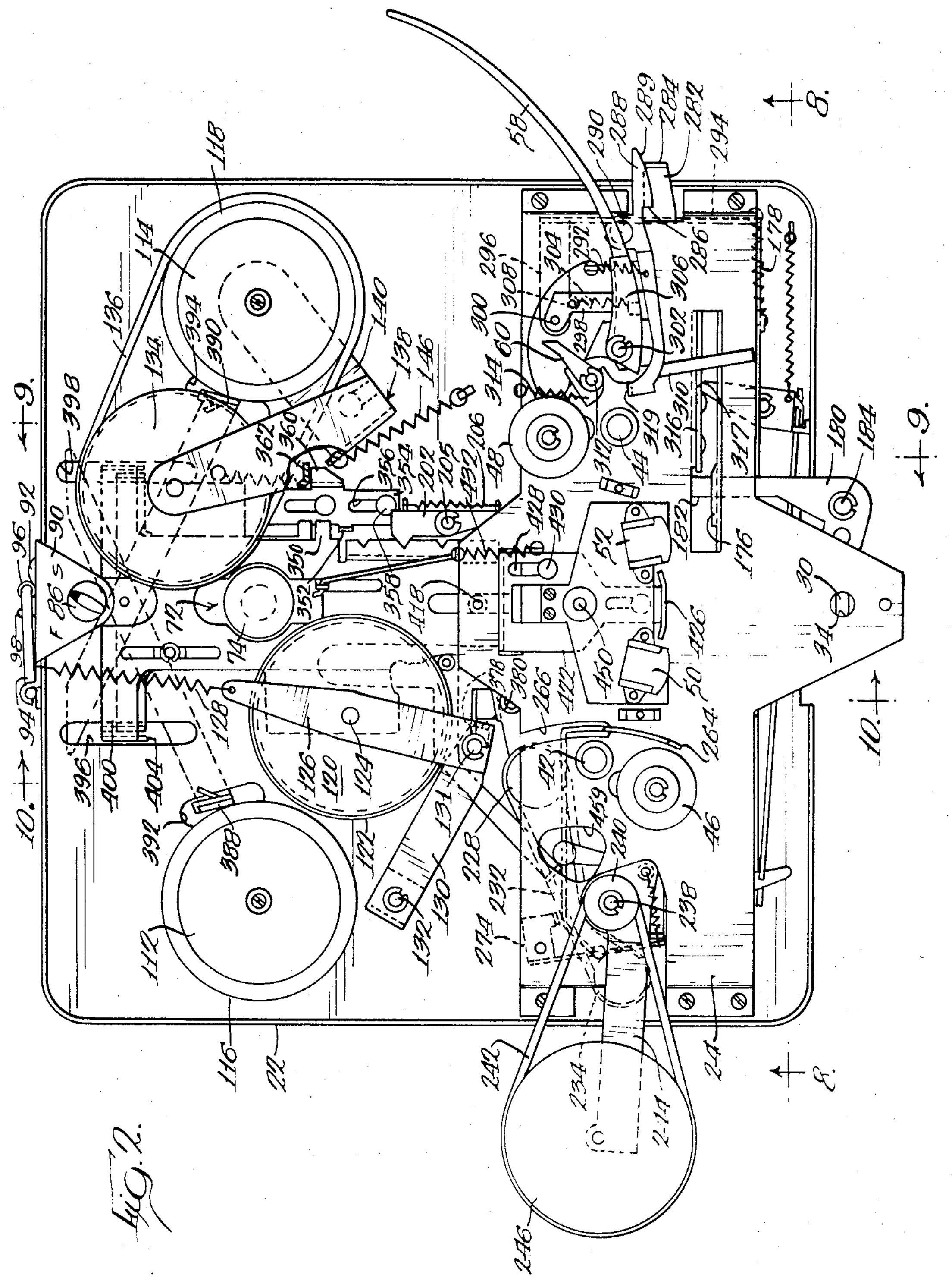
FIG. 2 is a top plan view of the tape recorder of the present invention, with the mechanism in a "Stop" position and with the tape recorder deck removed.

Turning now to the drawings in detail, the tape recorder 20 of the present invention includes a generally square main chassis 22 having a generally rectangular sub-chassis 24 screwed, or otherwise suitably secured to the upper surface thereof adjacent the forward edge, as viewed in FIG. 2. Although the following description of the tape recorder structure will be in reference to the main chassis 22 being horizontally disposed, the tape recorder of the present invention is particularly well adapted for use in a near vertical position, wherein the main chassis may be inclined rearwardly a slight amount from the vertical, as for example 2°. An enlarged deck 26 (FIG. 1) is positioned over the tape recorder chassis, and a suitable cabinet, not shown, is provided the house the tape recorder structure.

The function selecting means of the tape recorder 20 includes a control knob 28 adjacent the central front portion of the tape recorder, and the control knob 28 is rotatable between six positions, reading in a counterclockwise direction in FIG. 1, "Automatic Tape Feed," "Forward Play - Fast Forward", "Stop", "Reverse Play - Fast Reverse." Control knob 28 is carried upon a selector shaft 30 that extends through a clearance opening 32 in the deck 26, and which is rotatably mounted in openings 34 and 36 is sub-chasses 24 and main chassis 22, respectively. As will hereinafter appear, shaft 30 is mounted for vertical movement, and the automatic tape feed, forward play and reverse play functions can be selected when the shaft 30 is in an upper position, while the fast forward and fast reverse functions can be selected when the shaft 30 is depressed.

A tape supply means 38 is mounted upon a suitable support to be hereafter described in detail, and a tape take-up means 40 is mounted alongside supply means 38 upon a suitable support, also to be hereafter described in detail. The supply means 38 may take the form of a conventional tape reel within a cartridge structure, such as that disclosed in pending Tatter et al application Ser. No. 601,916, filed Dec. 15, 1966, and assigned to the assignee of the present invention. The take-up means 40 preferably is a reel having means for automatically gripping the end of a tape or tape leader and the reel may be the same as that disclosed in Tatter et al application Ser. No. 522,229, filed Jan. 21, 1966, now U.S. Pat. No. 3,330,496, and also assigned to the assignee of the present application. The tape moves from supply means 38 along a tape path including capstans 42 and 44, pressure rollers 46 and 48, and magnetic heads 50 and 52 to the take-up means 40. An arcuate tape guiding surface 54, preferably formed integrally with deck member 26, or upon a separate member removably mounted upon deck member 26, is provided to guide the tape past the transducing heads during an automatic tape threading operation to be hereafter described. Feed out means 56 is provided adjacent supply means 38 for automatically stripping tape from the tape supply reel and feeding it out of supply means 38 into the tape path, and a guide finger 58 is provided adjacent take-up means 40 for guiding the forward end of the tape or tape leader into the tape gripping means of the take-up reel. A sensing finger 60, which is responsive to tension in the tape after it has been gripped by the take-up reel, is provided for moving pressure pads, not shown in the exemplary arrangement, into engagement with heads 50 and 52. Such movement of the pressure pads does not constitute a portion of the present invention and is described in detail in the copending application Ser. No. 406,239 of Tatter et al, filed Oct. 26, 1964, and assigned to the assignee of the present application.

Figure 8:
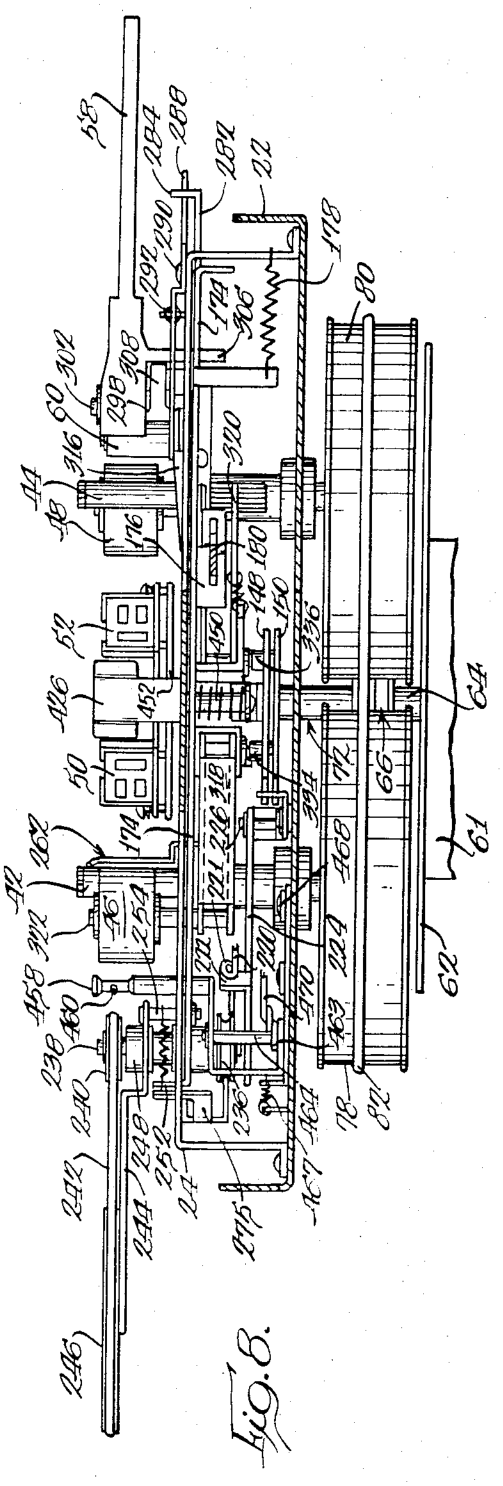
FIG. 8 is a sectional view, taken generally along line 8—8 of FIG. 2.
Figure 10:
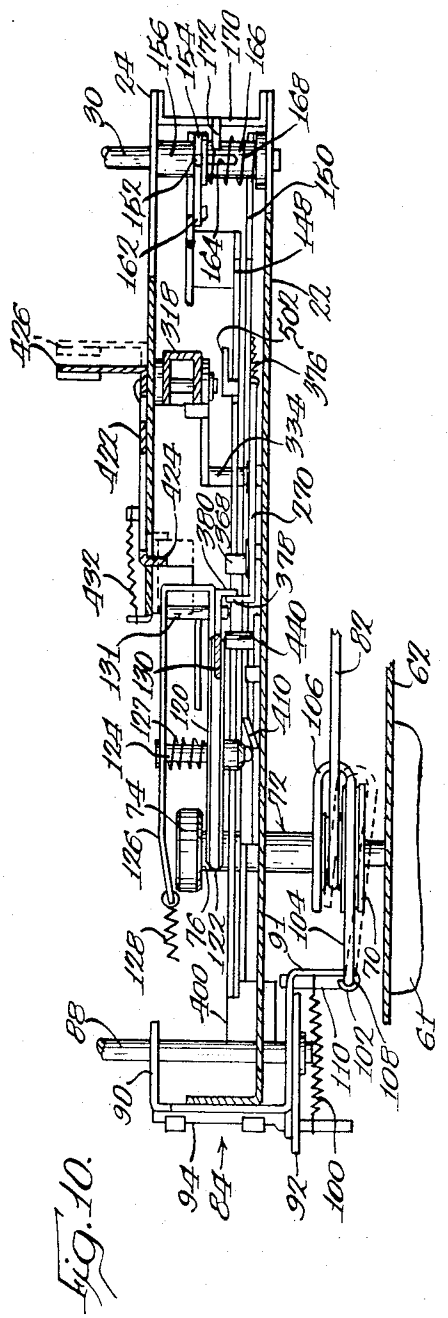
FIG. 10 is a sectional view, taken generally along line 10—10 of FIG. 2.
Figure 11:
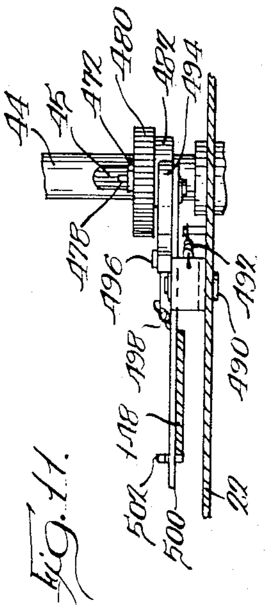
FIG. 11 is an enlarged detail view, taken generally along line 11—11 of FIG. 3.

A drive motor 61 is provided for rotating the supply reel 38 and take-up reel 40, as well as the capstans 42 and 44, and the motor 61 (FIGS. 8 and 10) is carried by a bracket 62 that is secured to the undersurface of the main chassis 22. As best shown in FIG. 10, the output shaft 64 of motor 61 has a stepped pulley 66 mounted thereon beneath chassis 22, and the pulley 66 includes an upper pulley portion 68 of small diameter, and a lower pulley portion 70 of large diameter. While in the exemplary arrangement two pulley portions are shown, it will be apparent that any desired plurality of such pulley portions may be included in the pulley 66. A sleeve 72 is also fixed to the output shaft 64 of the motor 61. The sleeve 72 includes a lower portion 76 that extends upwardly through a suitable clearance opening in chassis 22 (and through clearance openings in upper and lower slides to be hereafter described) and further includes a portion of enlarged diameter 74 at the upper end of the sleeve. Cylindrically shaped flywheels 78 and 80 (FIG. 8) are secured to the lower ends of capstan shafts 42 and 44, respectively, and a belt 82 extends around pulley 66 and flywheels 78 and 84 for rotation of capstans 42 and 44.

Speed change means 84, best seen in FIGS. 2 and 10, is provided for shifting belt 82 between pulley portions 68 and 70 for changing the rotational speed of capstans 42 and 44. The speed change mechanism 84 includes a control knob 86 at the rear central portion of the tape recorder that is carried by a vertically extending shaft 88. Shaft 88 is mounted for pivotal movement relative to a generally U-shaped shaft supporting bracket 90 that is mounted upon the main chassis 22, and a detent cam 92 is fixed to the lower end of shaft 88 beneath bracket 90. A detent rod 94 is mounted upon bracket 90 for pivotal movement about a vertical axis, and cam 92 includes a pair of detent notches 96 and a pair of detent stops 98 (one of each being shown in FIG. 2) for releasably retaining the detent cam in fast and slow positions. A spring 100 is connected to the lower end of detent rod 94 to one side of its pivot axis for urging the same against cam 92. A downwardly extending portion 91 is provided at the forward end of the lower leg of bracket 90, and portion 91 includes curved tabs 102 that define a horizontal pivot axis. The horizontally disposed portion 108 of a belt shifting rod 104 is rotatably received in tabs 102, and rod 104 has a U-shaped forward end portion 106 for shifting the belt 82 between the pulley steps 68 and 70. Rod 104 includes an upwardly extending rear end 110 that is connected to one end of spring 100 for biasing the rod 1004 toward the full line positon of FIG. 10 wherein the belt 82 is disposed around the small diameter diameter pulley step 68. When it is desired to change the speed of the capstans, shaft 88 is pivoted and cam 92 engages link portion 110 to pivot the link to the broken line position, whereupon U-shaped portion 106 shift belt 82 from pulley step 68 to pulley step 70. Spring 100 releasably retains the detent rod 94 in the selected notch 96, and stops 98 engage rod 94 to limit the rotation thereof. Since such speed change arrangements are well known in the art, greater details thereof will not be set forth herein.

Figure 9:
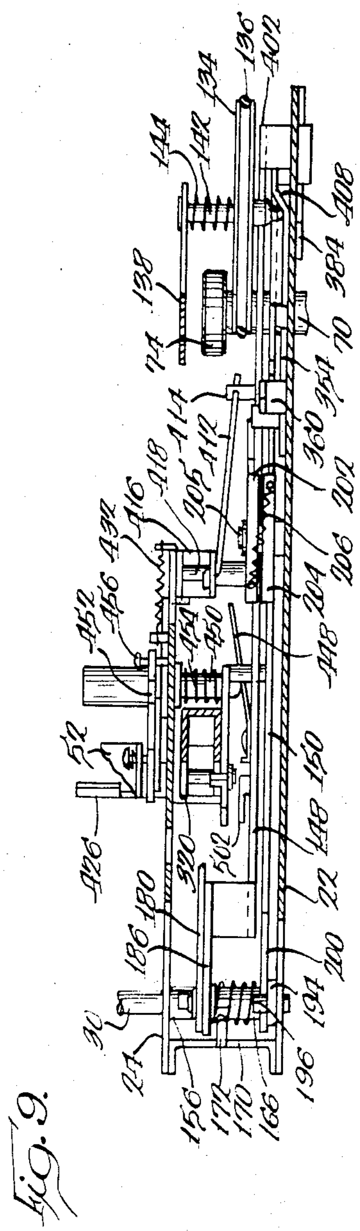
FIG. 9 is a sectional view, taken generally along line 9—9 of FIG. 1.

Supply means 38 and take-up means 40 are mounted respectively upon rotatable turntables 112 and 114, with turntables 112 and 114 including respective hubs 116 and 118 that extend below the deck 26 where they are rotatably mounted upon the chassis 22. The structure (FIGS. 14 and 15) for holding the supply and take-up means on their respective turntables will hereinafter be described in detail. The drive means for rotating turntable 112 can be best understood from FIG. 10, while the drive means for rotating turntable 114, can be best understood from a consideration of FIG. 9.

The drive means for rotating turntable 112 includes a rotatable idler wheel 120 having a belt 122 around the periphery thereof, and idler wheel 120 is normally retained in spaced relationship from turntable hub 116 and sleeve 72 (FIG. 2) in the Stop position of the tape recorder by means to be hereafter described in detail. As will also be hereinafter described, idler wheel 120 is movable vertically between sleeve steps 74 and 76 to change between rewind and fast rewind functions. Idler 120 is carried by a shaft 124 that is rotatably mounted on an arm 126, and a spring 128 is connected between arm 126 and bracket 90 to urge the idler 120 toward engagement with the turntable hub 116 and the sleeve 72. A spring 127 surrounds idler shaft 124, and bears against arm 126 and idler 120 to bias the idler 120 downwardly to a level where it is positioned to engage the step 76 of sleeve 72. The end of arm 126 is connected at pivot 131 to the end of an idler movement controlling link 130 that is pivotally mounted upon the main chassis 22 and 132, and the function of link 130 will hereinafter become more fully apparent.

The drive means for rotating turntable 114 includes an idler 134 having a belt 136 trained thereover and over the hub 118 of turntable 114. Idler 134 is retained in spaced relationship with respect to sleeve 72 in the Stop position of the tape recorder, by means to be hereafter described. Idler 134 is mounted for rotation upon a generally L-shaped bracket 138 including an arm 140 that is mounted for pivotal movement about the axis of turntable 114. Idler 134 is carried by a generally vertically extending shaft 142 that is rotatably mounted in an end of bracket 138, and a spring 144 surrounds shaft 142 and is biased between bracket 138 and idler 134 to urge the idler downwardly to a level where it is positioned to engage the lower step 76 of sleeve 72. A spring 146 is connected between bracket 138 and the main chassis 22, and urges the idler 134 toward engagement with sleeve 72, with means to be hereafter described in detail being provided for releasably retaining the idler 134 spaced from the sleeve 72.

Figure 6:
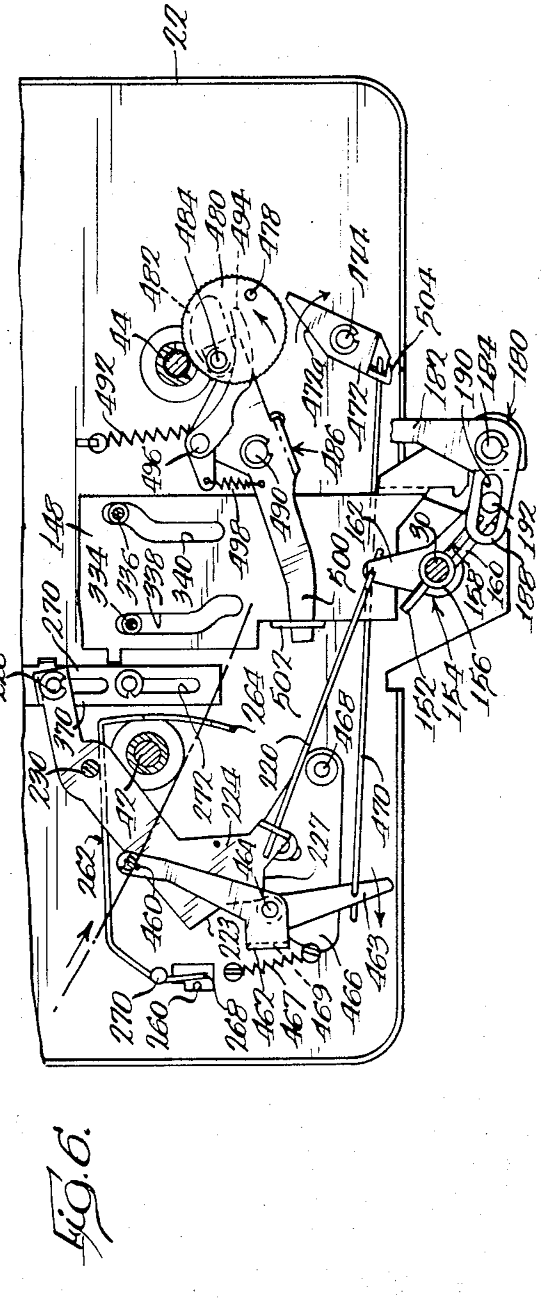
FIG. 6 is a fragmentary plan view, similar to FIG. 5, and illustrating the relationship of the mechanism at an intermediate portion of the tape reversal function.

Control means, responsive to rotation of shaft 30, is provided for selecting the desired tape recorder function, and in the illustrated embodiment, the control means includes a pair of stacked, centrally disposed, longitudinally movable slides 148 and 150; with the upper slide 148 being adapted to control the automatic tape feed, forward and reverse functions, and with the lower slide 150 being adapted to control the fast forward and fast reverse functions. Longitudinally extending slots 147 at the rearward end of upper slide 148 and longitudinally extending slots 151 at the rearward end of lower slide 150 receive pins 149 therethrough to guide the slides for longitudinal reciprocating movement relative to one another and relative to the main chassis 22. A pin 152 extends transversely outwardly from opposite sides of control shaft 30, and the hub 156 (FIGS. 9 and 10) of a set lever 154 is rotatably mounted upon shaft 30 and is adapted to be keyed to shaft 30 for movement therewith by pin 152. To this end, a horizontally elongate slot 158 (FIG. 6) is provided in an arm 160 of lever 154, and is adapted to retain one end of pin 152 therein, so that rotation of shaft 30 will in turn rotate lever 154. Lever 154 includes an opposite arm 162 connected to means for initiating the automatic feeding of tape from the supply means, as will hereinafter appear.

A sleeve 166 (integral with lower slide 150) is rotatably mounted upon shaft 30 beneath lever 154, and sleeve 166 includes a vertically elongate slot 164 (FIG. 10) therein for reception of pin 152 to key the sleeve 166 to shaft 30 when the shaft is depressed and pin 152 moves downwardly into slot 164. A coil spring 168 surrounds sleeve 166, and biases lever 154 upwardly so that the pin 152 is normally positioned to engage the slot 158 in lever 154. A bracket 170 is connected between main chassis 22 and sub-chassis 24, and a pair of laterally spaced horizontally disposed fingers 172 extend inwardly of bracket 170, so that when pin 152 is received in slot 164 and the shaft 30 is rotated, the pin 152 will move under a finger 172 to releasably retain the shaft 30 in the depressed position against the bias of spring 168.

Figure 3:
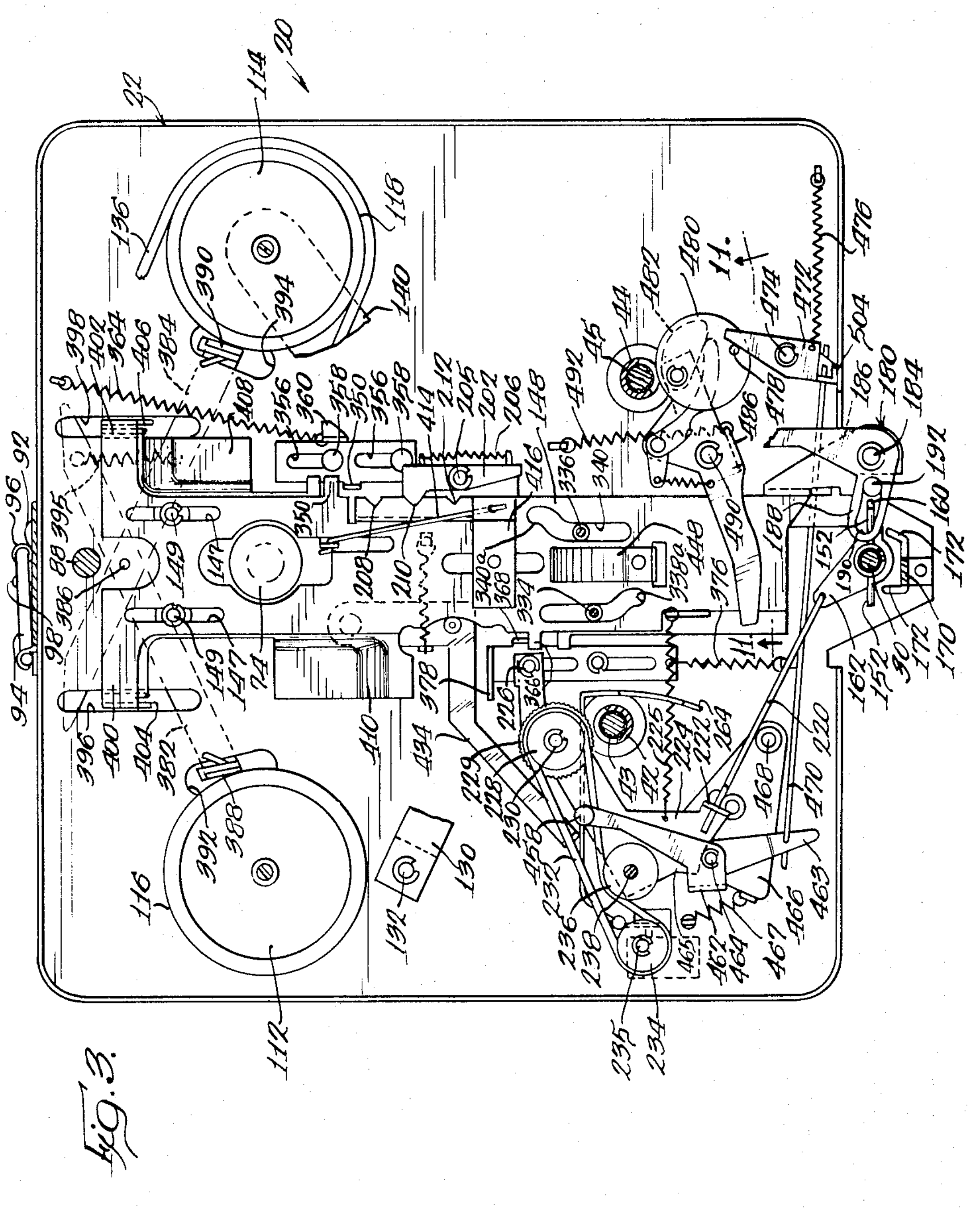
FIG. 3 is a top plan view, similar to FIG. 2, but with the sub-chassis at the front of the tape recorder removed.
Figure 4:
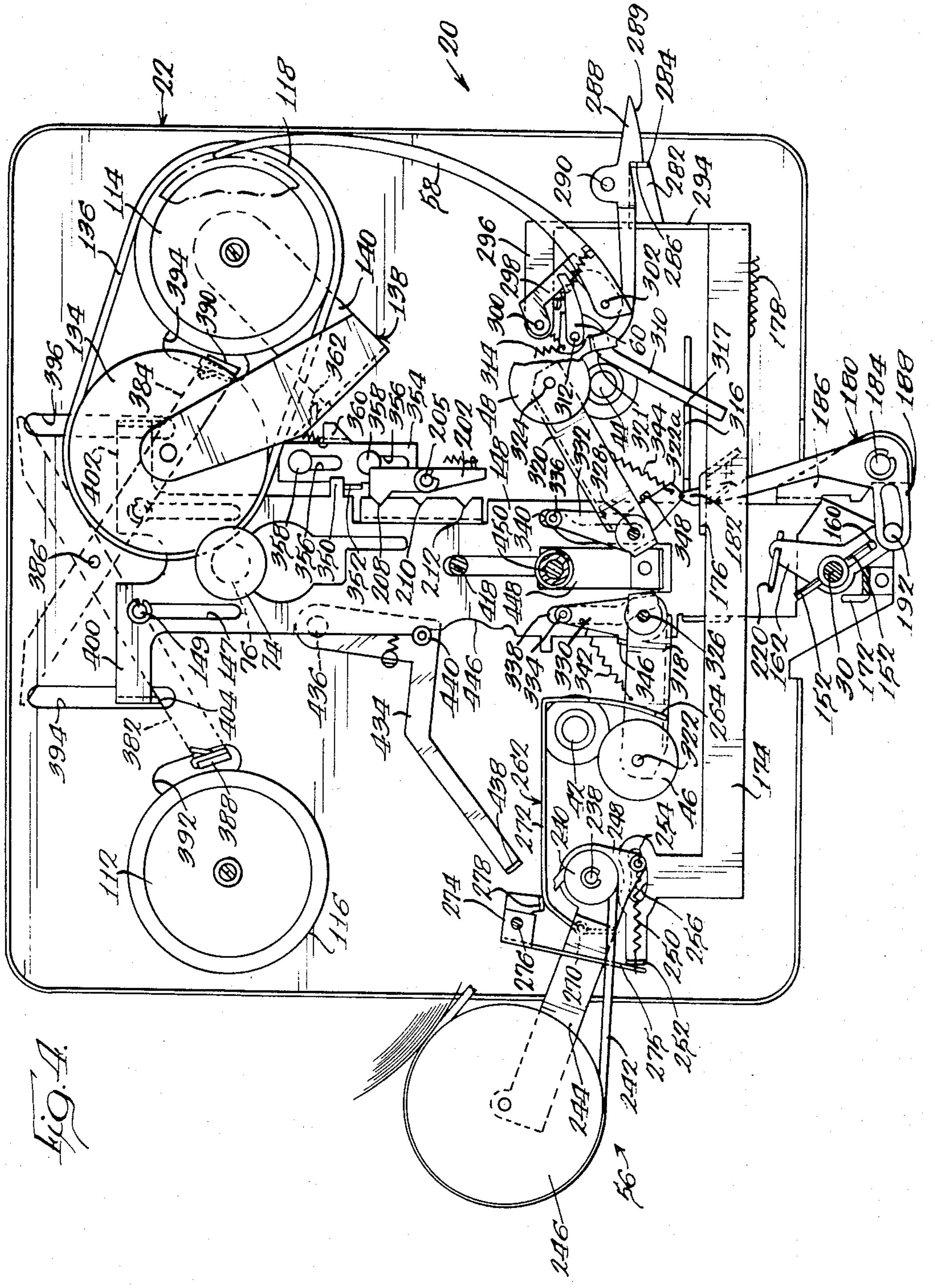
FIG. 4 is a top plan view, similar to FIG. 2, but with certain parts broken away for clarity of illustration, and with the mechanism in an "Automatic Tape Feed" position.

A generaly laterally movable shifter link 174 (FIG.S 4 and 8) is adapted to actuate the automatic tape threading means, and link 174 is urged to the right, as viewed in FIG. 4, by a spring 178 that is connected to the sub-chassis 24. Link 174 includes a downwardly extending, generally centrally disposed tab 176 that is positioned to be engaged by the end 182 of a pivotally mounted set lever 180 for moving the link 174 to the left against the bias of spring 178. Lever 180 is connected at a pivot 184 to a forwardly and upwardly extending projection 186 of the upper slide 148, and lever 180 includes an arm 188 having an elongate slot 190 therein, with a pin 192 on the arm 160 of link 154 extending through slot 190. Thus, when shaft 30 is pivoted in a counterclockwise direction from the Stop position of FIG. 3 to the "Automatic Tape Feed" position of FIG. 4, pin 152 pivots link 154, and pin 192 pivots lever 180 in a counterclockwise direction, so that the end portion 182 of lever 180 engages the tab 176 on link 174 to shift the link to the left and actuate the automatic tape feeding means to be hereafter described. Rotation of shaft 30 in either direction also moves the upper slide 148 forwardly or rearwardly through link 180 to actuate further tape recorder structure to be hereafter described.

Figure 13:
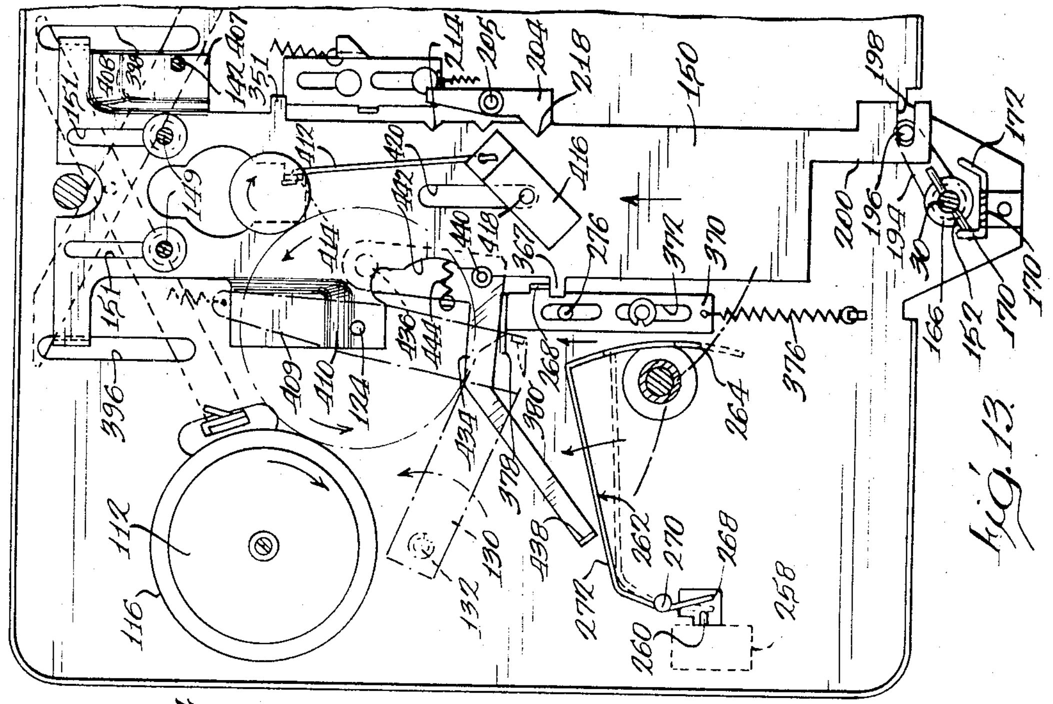
FIG. 13 is a fragmentary plan view of the lower slide and mechanism actuated thereby during a fast rewind operation.
Figure 12:
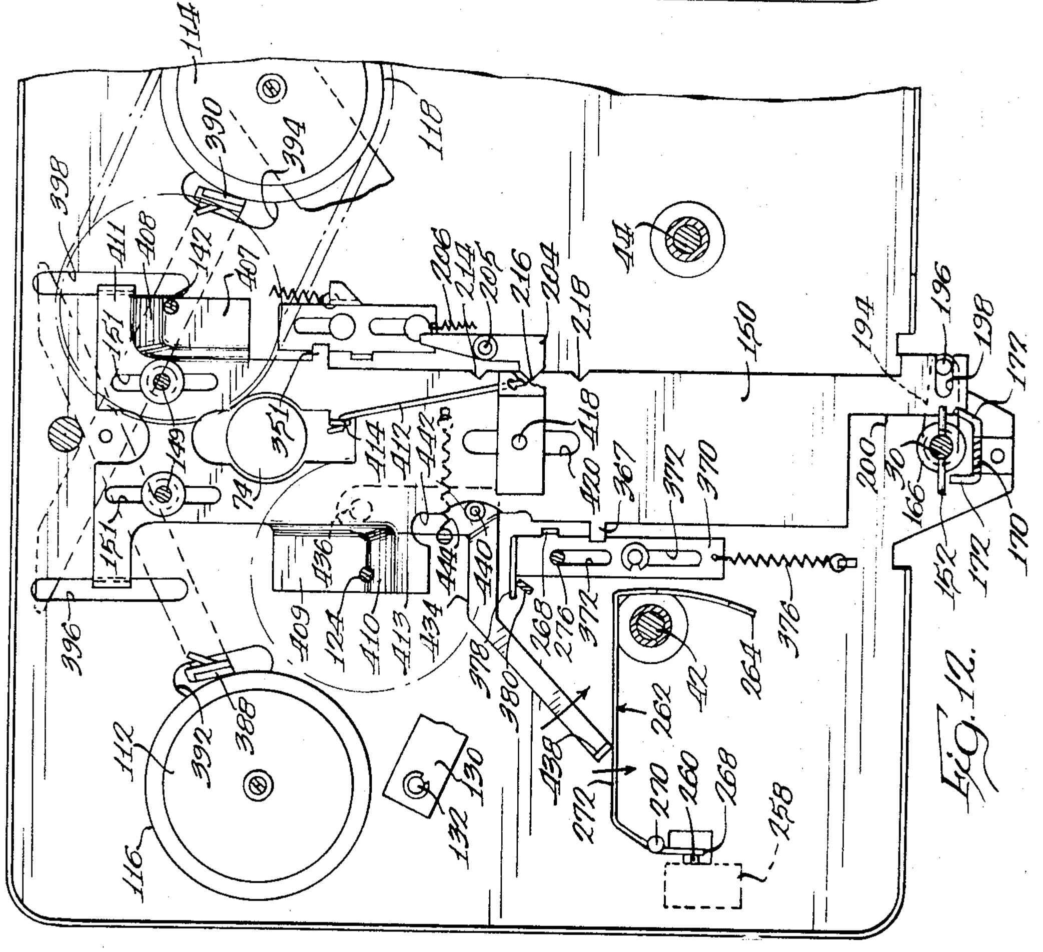
FIG. 12 is a fragmentary plan view of the lower slide and mechanism actuated thereby in the "Stop" position.

As is evident from FIGS. 12 and 13, an arm 194 extends laterally outwardly from sleeve 166, and includes an upwardly extending pin 196 at the outer end thereof that is received in a slot 198 in a forwardly extending portion 200 of lower slide 150. Thus, by depressing the shaft 30 and rotating the same to position pin 152 under either of the fingers 172, the lower slide 150 will be moved forwardly or rearwardly to actuate fast wind or fast rewind structure as will be hereafter described.

The slides 148 and 150 are each movable between three positions, and dual detenting means is provided for releasably retaining each of the slides in the selected position. The detenting means includes an upper detent lever 202 associated with upper slide 148 and a lower detent lever 204 associated with lower slide 150, with each of the detent levers being mounted for pivotal movement on a common shaft 205. The upper slide 148 includes three spaced detent notches 208, 210 and 212 (FIGS. 3, 4 and 7) in one side thereof corresponding, respectively, to the automatic tape feed and forward position, the normal or off position, and the reverse position. The lower slide 150 includes three spaced detent notches 214, 216 and 218 (FIGS. 12 and 13) in one side thereof corresponding respectively to the fast forward position, the off or normal position, and the fast reverse position. A spring 206 (FIG. 3) extends between levers 202 and 204 to urge the detent portions of the levers 202 and 204 into engagement with slides 148 and 150, respectively.

The feed out means 56 for automatically feeding tape outwardly from the tape supply means is driven from capstan 42, and to this end, a wire link 220 is connected between an arm 162 of lever 154 and an upwardly extending tab 222 on a link 224, the right hand end of which is pivoted to the main chassis 22 at 226. As can be best seen in FIG. 8, wire link 220 includes a loop 221 intermediate the ends thereof that bears against tab 222 to pivot the link 224 when shaft 30 is rotated in a counterclockwise direction. A spring 225 is connected between link 224 and the upper slide 148 to bias the link 224 in a counterclockwise direction about pivot 226, as viewed in FIG. 3, so that when the shaft 30 is rotated in a clockwise direction from the Stop position, illustrated in FIG. 3, to the Automatic Tape Feed position, illustrated in FIG. 4, the spring 225 will pivot the link 224 in a counterclockwise direction about pivot 226. A pulley 228 is carried by a shaft 230 that is rotatably mounted upon link 224, and pulley 228 includes a toothed portion 229 that is adapted to move into engagement with a gear 43 formed integrally with capstan 42, when the link 224 is moved in a counterclockwise direction by spring 225. A belt 232 is trained over pulley 228 and over a further pulley 234 that is mounted at a fixed location on chassis 22 by shaft 235. A reach portion of the belt 232 bears against a further pulley 236 that is carried by a shaft 238 which is rotatably mounted on the main chasis 22. Shaft 238 extends from below to above sub-chassis 24, and a further pulley 240 is carried by shaft 238 above the main chassis. A belt 242 is trained over pulley 240 and over a still further large diameter pulley 246 that is rotatably mounted at the end of an arm 244. Arm 244 is mounted for pivotal movement about shaft 238 and includes a crank portion 248 (FIG. 4) adjacent shaft 238, and a pin 254 extends downwardly from crank 248 below the main chassis 22.

Shifter link 174 includes an arcuate slot 256 in the left land end thereof, and pin 254 is received in slot 256 with the left hand end of slot 256 engaging pin 254 in the Stop position to retain pulley 246 spaced from the tape supply means. When the shifter link 174 moves to the left to the position of FIG. 4, arm 244 is pivoted in a clockwise direction about shaft 238 by a spring 250 connected between arm 244 and end portion 275 of a link positioning arm 274 to bring the belt 242 on pulley 245 into engagement with the tape or tape leader within the tape supply means, to feed tape outwardly into the tape path. When the tape is gripped by the tape take-up means 40, finger 60 senses tension in the tape and actuates mechanism to be hereafter described for shifting link 174 to the right to move feed out wheel 246 away from the tape supply means.

Automatic shut off means is provided for automatically shutting off the tape recorder at the end tape play, and this means will be best understood from FIGS. 4, 12 and 13. A switch 258 is connected in circuit with the drive motor 61, and switch 258 includes a switch actuator 260 that is biased outwardly of the switch on an open position by internal resilient means, as is well known. A switch actuating and tape sensing link 262 is provided to move the switch actuator 260 inwardly to a switch closing position, and link 262 includes an upwardly extending end 264 that is normally disposed in the tape path to be engaged by the tape as it moves along the path. As can be best seen in FIG. 2, the portion 264 of link 262 extends upwardly through an arcuate slot 266 in sub-chassis 24. Link 262 includes a portion 268 at an end opposite from portion 264 and portion 268 extends downwardly through an opening in chassis 22 adjacent switch 258 into position to engage switch actuator 260. Link 262 is mounted to the main chassis 22 for movement about a vertical pivot 270 adjacent link end 268, and an elongate central portion 272 of link 262 extends between pivot 270 and upwardly extending portion 264. As can be seen in FIG. 4, the link positioning arm 274 is mounted for pivotal movement at 276 upon the chassis, and the end portion 275 is positioned to be engaged by the tab 252 at the left hand end of the shifter link 174. Arm 274 includes an abutment 278 that is positioned to engage the central portion 272 of link 262, and the arm 274 is biased in a counterclockwise direction about pivot 276 by spring 250, as shown in FIG. 4. When no tape is present in the tape path, the internal spring means of switch 258 biases the lever 262 to the full line position of FIG. 13, to interrupt the circuit to the drive motor, but when operation of the tape recorder is initiated and shifter link 174 is moved to the left from the "Stop" position of FIG. 3 to the Automatic Tape Feed position of FIG. 4, tap 252 pivots arm 274 in a clockwise direction against the bias of spring 250, and abutment 278 engages link portion 272 to pivot the link 262 in a clockwise direction about pivot 270, so that link portion 268 will engage the switch actuator 260 to retain the drive motor 61 energized, while the sensing portion 264 of link 262 moves forwardly of the tape path into a sensing position. Once the tape is fed past sensing portion 264, and as long as tape is present in the tape path, link 262 retains motor 61 energized. Further means, to be hereafter described, responsive to movement of slides 148 and 150, is provided to allow link 262 to pivot to a switch open position when tape is no longer present in the tape path.

Means is provided for releasably retaining shifter link 174 in the position of FIG. 4, and said means includes an arm 282 extending outwardly from a rearwardly extending portion 294 at the right end of the shifter link. Arm 282 includes an upwardly extending tab 284 at the end thereof, and tab 284 rides over a shoulder 286 on a lever 288 that is pivoted to the chassis at 290. A cam surface 289 is provided on lever 288, and is engaged by the tab 284 as the shifter link is moved from the position of FIG. 2 to the position of FIG. 4, so that the lever 288 is pivoted in a counterclockwise direction about pivot 290 during this latter movement. A spring 292 is connected to lever 288 at the side of pivot 290 opposite from cam surfae 289 and biases the lever 288 in a clockwise direction, as viewed in FIG. 2. When play is initiated by rotation of shaft 30 to the Automatic Tape Feed position (FIG. 4), upper slide 148 moves forwardly as the shifter link 174 moves to the left, and the detent portion of lever 202 engages notch 208 to retain slide 148 in its forward position, while shoulder 286 engages tab 284 to retain the link 174 in its shifted position.

Means is provided for shifting tape guide finger 58 into a tape guiding position when operation of the tape recorder is initiated, and said means includes a portion 296 of the shifter link 274 that extends laterally inwardly from the upper portion of the rearwardly extending portion 294 of the shifter link. A further link 298 is pivotally connected to the upper surface of shifter link portion 296 at 300, and guide finger 58 and link 298 are pivotally connected to the sub-chassis 24 at 302. A spring 304 is connected between a finger 308 on link 298 and a tab 306 on guide finger 58 to bias the guide finger in a counterclockwise direction about pivot 302, as viewed in FIG. 2. Thus, when shifter link 174 moves to the left to the position of FIG. 4, link 298 is pivoted in a counterclockwise direction about pivot 302, and spring 304 pulls against tab 306 to pivot guide finger 58 in a counterclockwise direction into the tape guiding position illustrated in FIG. 4.

Figure 5:
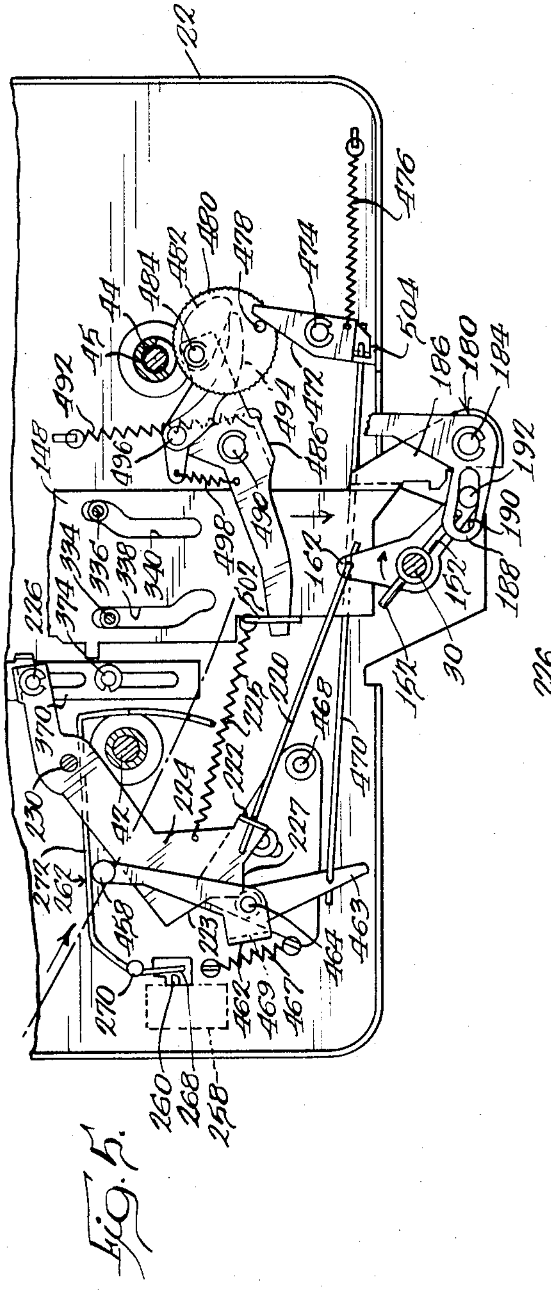
FIG. 5 is a fragmentary plan view, similar to FIG. 4, and illustrating the relationship of the mechanism during the initiation of a tape reversal function.

Means is provided for allowing the shifter link 174 to move to the right after the tape has been gripped by the take-up means 40, and said means includes a release link 310 pivotally connected to the sub-chassis 24 at 312. A spring 314 is connected between the link 310 and the chassis to bias the link 310 in a clockwise direction, as viewed in FIG. 2. Tape tension sensing link 60 is mounted on release link 310 at 312, and when the tape is gripped by the take-up means 40, the tension in the tape pivots links 60 and 310 from the position of FIG. 4 to the position of FIG. 2. To enable the shifter link 174 to move to the right from the position of FIG. 4, a downwardly extending tab 319 at the left hand end of link 288 moves over an arcuate cam surface 321 on the return lever 310 when the return lever is pivoted, so that the shoulder 286 moves out of engagement with tab 284, allowing spring 178 to move the shifter link to the right. A manually operable longitudinally movable link 316 is carried by the sub-chassis 24, and includes a shoulder 317 that is positioned to engage link 310. Link 288 will also be pivoted to a position wherein shoulder 286 is spaced from tab 284 when link 316 is moved to the right, as viewed in FIG. 4, and thus link 316 provides means for manually shifting link 174 to the right from the position illustrated in FIG. 4. It will be understood that movement of the shifter link 174 to the right from the position of FIG. 4, either manually or automatically, shifts the feed out means 56 and guide finger 58 to inactive positions, such as shown in FIG. 2. Also, movement of shifter link 174 to the right causes the abutment 176 to pivot the lever 180 in a clockwise direction to the position of FIG. 5, and the engagement of slot 190 with pin 192 pivots lever 160 in a counterclockwise position about shaft 30. This latter movement shifts link 220 to the left and pivots link 224 in a clockwise direction about pivot 226 to shift gear **22*a* out of engagement with capstan gear 43.**

Means is provided for shifting pressure roller 48 into engagement with capstan 44, when operation of the tape recorder has been initiated by selection of an automatic tape threading function, or when a fast forward function has been selected. Shifting means is also provided for shifting pressure roller 46 into engagement with capstan 42 when rewind or fast rewind functions have been selected. Pressure rollers 46 and 48 are, respectively, mounted upon arms 318 and 320 at 322 and 324; and arm 318 is pivotally mounted upon a shaft 326, while arm 320 is pivotally mounted upon a shaft 328. A link 330 is also pivotally mounted upon shaft 326 and extends generally rearwardly therefrom, while a corresponding link 322 is pivotally mounted upon shaft 328 and also extends generally rearwardly therefrom. A vertically extending pin 334 is provided at the rearward end of link 330, while a vertically extending pin 336 is provided at the rearward end of line 332, with pin 334 impaling slot 338 in the upper slide 148 and the pin 336 impaling a further slot 340 in the upper slide 148. A spring 342 is connected between link 330 and arm 318, and biases a stop 346 on link 330 against a rearward side of arm 318. A spring 344 is connected between arm 320 and a forwardly extending portion 322a of link 332 to bias a stop 348 on the link 332 against the forward side of arm 320. Slot 338 includes an offset portion 338a adjacent the forward end thereof, and slot 340 includes an offset portion 340a adjacent the rearward end thereof, with the inclined slot surfaces adjacent the offset slot portions serving as cam means engageable with the pins 334 and 336 to pivot the respective links 330 and 332 thereby allowing springs 342 and 344 to pivot the associated arms 318 and 320 to bring the pressure rollers 46 and 48 into engagement with their respective capstans 42 and 44. When the upper slide 148 is moved forwardly from the Stop position of FIG. 2 to the Automatic Tape Feed position of FIG. 4, pin 336 rides over the cam surfaces within slot 340, while the straight portion of slot 338 moves forwardly with respect to pin 334, so that the pressure roller 48 moves into engagement with capstan 44 while pressure roller 46 remains spaced from capstan 42. In a like manner, when the upper slide 148 is moved rearwardly during a tape reverse function (FIG. 7), slot 340 merely moves rearwardly with respect to pin 336, while the cam surfaces in slot 338 engage the pin 334 to pivot the link 330, so that the pressure roller 46 moves into engagement with the capstan 42, while the pressure roler 48 remains spaced from the capstan 44.

The means permitting idler 134 to rotate turntable 114 when a forward operation of the tape recorder has been selected includes a tab 350 (FIG. 4) that extends outwardly from an intermediate portion of the right-hand side of upper slide 148. A slide member 354 is mounted for longitudinal movement upon the main chassis 22 adjacent slide 148, and slide member 354 includes a pair of spaced slots 356 that are impaled by guide pins 358. An abutment 352 extends upwardly from the left-hand side of slice member 354, and is positioned to be engaged by the tab 350 on the upper slide 148, when the upper slide moves forwardly to the position of FIG. 4. A spring 364 is connected between a stop 360 on the right-hand side of slide member 354 and the main chassis to bias the slide member 354 rearwardly. Stop 360 normally engages a further stop 362 on arm 138 when the tape recorder is in the Stop position to retain the idler wheel 134 spaced from sleeve 72, and when the main slide 148 is moved forwardly, tab 350 on the slide 145 engages abutment 352 on slide member 354 to move the stop 360 forwardly out of engagement with stop 362, allowing spring 146 to pivot arm 138 about shaft 142 to move the idler 134 into engagement with sleeve 72.

Figure 7:
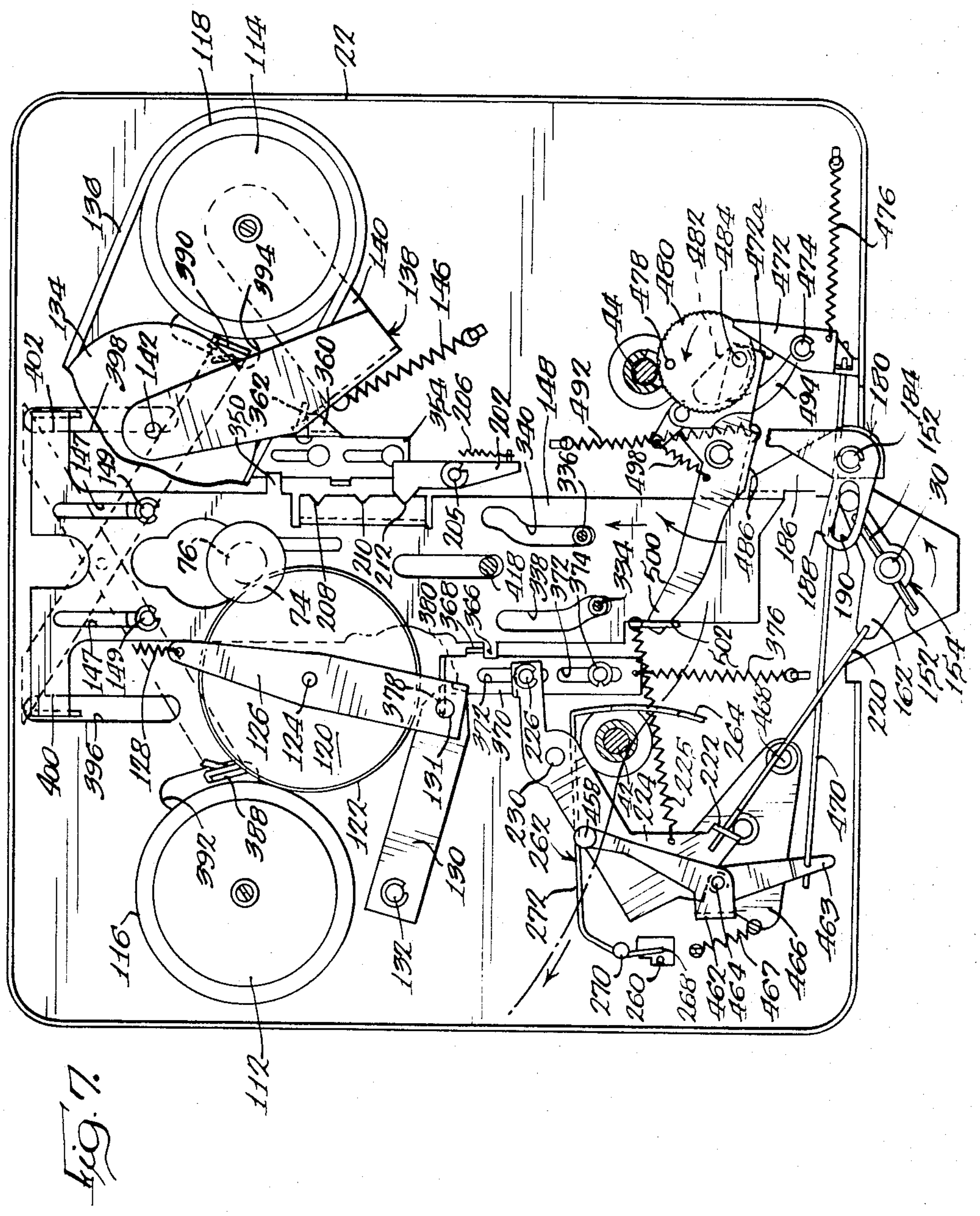
FIG. 7 is a plan view, similar to FIGS. 4–6, and illustrating the relationship of the mechanism during a still further portion of the tape reversal function.

The means for shifting idler 120 into engagement with turntable 116 will be best understood from a consideration of FIGS. 7 and 10. A tab 366 extends outwardly from the left-hand side of upper slide 148 intermediate the ends thereof, and is positioned to engage an abutment 368 on a further slide member 370. Slide member 370 includes a pair of spaced, elongate slots 372, and pin 374 and pivot 276 impale slots 372 and cooperate to guide slide member 370 in its longitudinal movement. A spring 376 is connected between the forward end of slide member 370 and the main chassis 22 to urge the slide member 370 forwardly. An abutment 378 extends upwardly from the rearward end of slide member 370 and is positioned to engage a corresponding abutment 380 on arm 130. Thus, the engagement of abutment 378 with abutment 380 normally retains the idler 120 spaced from the hub 116 of turntable 112, but when the upper slide 148 is moved rearwardly, tab 366 engages abutment 368 on slide member to move the abutment 378 rearwardly out of engagement with abutment 380, allowing spring 128 to pivot arm 130 in a counterclockwise direction and move idler 120 into engagement with the hub of turntable 112.

A scissors brake mechanism is provided for stopping turntables 112 and 114 and for holding them against rotation when idlers 120 and 134 are spaced respectively from sleeve 72, and the brake mechanism includes a pair of crossed brake arms 382 and 384 pivoted to one another intermediate their length and to the main chassis 22 at 386. A plate 388 extends upwardly from the left-hand end of arm 382 through an opening 392 in the main chassis, and includes a suitable facing material adapted to engage the periphery of hub 116 and hold turntable 112 against rotation. In a like manner, a plate 390 extends upwardly from the right-hand end of arm 384 through an opening 394 in the main chassis 22, with plate 390 also being covered with a suitable facing material to engage the hub 118 of turntable 114. A spring 395 (FIG. 3) is connected between brake arms 382 and 384 to urge their respective facing materials into engagement with the turntable hubs. A pair of elongate slots 396 and 398 are provided in the main chassis 22 at the rear end thereof, and the upper slide 148 includes outwardly extending portions 400 and 402 at the rearward end thereof which have respective downwardly bent portions 404 and 406 at the outer ends thereof. Portions 404 and 406 provide abutments that are engageable with brake arms 382 and 384, respectively, when the upper slide 148 is moved forwardly to select a forward function, with the engagement of the abutments 404 and 406 with the brake arms 382 and 384 pivoting the brake arms to move the facing members thereon out of engagement with the turntable hubs. In a like manner, when the upper slide 148 is moved rearwardly to select a reverse function, the abutments 404 and 406 move into engagement with arms 384 and 382, respectively, to again pivot the facing members thereon out of engagement with the turntable hubs to enable the turntables to be rotated.

When it is desired to select a fast wind operation, as has been pointed out above, the shaft 30 is depressed to position the pin 152 beneath the plane of pin detent fingers 172, and shaft 30 is rotated in a clockwise direction to move lower slide 150 forwardly and position the detent portion of lever 204 in notch 214. Likewise, when it is desired to select a fast rewind operation, shaft 30 is depressed and rotated in a counterclockwise direction to the position of FIG. 13, to move the lower slide 150 rearwardly and locate the detent portion of lever 204 in notch 218. An inclined cam surface 408 (FIGS. 12 and 13) is provided adjacent the rearward end of the right hand side of lower slide 150, and a similar inclined cam surface 410 is provided on the left hand side of slide 150 intermediate the ends thereof. Cam surfaces 408 and 410 define means for shifting idler 134 and idler 120, respectively, vertically upwardly into a position to engage the large diameter step 74 of sleeve 72. To this end, the shaft 124 of idler 120 is positioned in longitudinal alignment with cam surface 410, while the shaft 142 of idler 134 is positioned in longitudinal alignment with cam surface 408. As can be seen in FIG. 12, in the off position, the end of shaft 142 is positioned on a first land area 407, forwardly of cam surface 408, while the end of shaft 124 is positioned on a first land area 409 rearwardly of inclined cam surface 410. When a fast forward function has been selected, the slide 150 moves forwardly and the shaft 142 rides up cam surface 408 to a second land area 411 as the idler 134 is elevated to the plane of sleeve step 74, while at the same time the lower end of shaft 124 moves rearwardly upon land area 409. When a fast rewind cycle has been selected, slide 150 moves rearwardly, and the lower end of shaft 124 rides up inclined cam surface 410 to a second land area 413 as idler 120 is elevated to the plane of sleeve step 74, while land area 407 merely moves rearwardly with respect to shaft 142. Abutments 351 and 367 extend outwardly from opposite sides of lower slide 150 to engage tabs 352 and 368, respectively, upon movement of the lower slide to enable the idlers to move into engagement with the sleeve 72.

During a fast wind or rewind cycle, it is desirable that the tape be shifted away from the tranducing heads 50 and 52, and the means for accomplishing this will be best understood from FIGS. 2, 9, 10, 12 and 13. As is shown therein, a wire link 412 extends between a stop 414 on lower slide 150 and a link 416 that is mounted for pivotal movement upon the main chassis at 418. Pivot pin 418 extends through an elongate slot 240 in the slide 150 to allow the slide to move longitudinally with respect to the main chassis, and a similar slot is provided in upper slide 148. A tape shifting member 422 is mounted for longitudinal movement upon subchassis 24, and member 422 includes a flange 424 at the rearward end thereof that extends downwardly through an opening in sub-chassis 24 into a position to be engaged by link 416. An elongate slot 428 is provided at one side of member 422, and is impaled by a pin 430 to guide the member 422 in its longitudinal movement. A spring 432 is connected between member 422 and the subchassis 24 to urge the member 422 rearwardly to a position out of engagement with the tape passing across the transducing heads 50 and 52. When a fast wind or rewind cycle has been selected by depressing the shaft 30 and rotating it in either a clockwise or counterclockwise direction, link 416 is pivoted through the action of lower slide 150 and 412, to move the link 416 into engagement with the downwardly extending flange 424 of member 422. The engagement of link 416 with flange 424 shifts the member 422 forwardly and moves a vertically upwardly extending portion 426 thereof across the tape path to shift the tape forwardly away from the heads 50 and 52.

Means is provided for conditioning link 262 to deenergize the drive motor 61 at the end of tape play, and said means is best seen in FIGS. 12 and 13 to include a lever 434 pivoted to the main chassis at the rearward end 436 of the lever. A tab 438 is provided at the laterally offset forward end of lever 434, and tab 438 is positioned to engage the central portion 272 of the switch actuating lever 262 in the Stop position to retain switch 258 closed. A cam follower 440 is provided on an intermediate portion of lever 434, and cam follower 440 is held in engagement with a cam surface 442 on the left side of lower slide 150 by a spring 444 that is connected between lever 434 and the main chassis. When a fast wind or fast rewind cycle has been selected, the cam follower 440 rides up upon the laterally offset portions of cam surface 442 to pivot the lever 434 about its rearward end 436 to cause the tab 438 to move away from the lever 262. A corresponding cam surface 446 is provided on the upper slide 148 to shift the lever 434 away from lever 262 during wind and rewind operations. Thus, when tape is no longer present in the tape path, switch actuator 260 pivots the lever 262 to the full line position of FIG. 13 as the switch actuator 260 moves outwardly, to de-energize the motor 61.

The tape recorder of the present invention is particularly adapted for use with multi-channel tape, and automatic means, to be hereafter described in detail, is provided for reversing the direction of tape movement after playing of the tape in one direction has been completed. Means is also provided, responsive to the tape reversing means, for shifting the transducing heads 50 and 52 into operative association with different channels of the tape when the tape direction is reversed. The means for lifting the transducing heads will be best understood from FIGS. 8 and 9, and as shown therein, a leaf spring 448 is secured adjacent its forward end to the upper slide 148, with spring 448 bearing against a vertically movable pin 450 carried by a head mounting plate 452 and extending downwardly through an opening in sub-chassis 24. A coil spring 454 surrounds pin 450 and engages the sub-chassis 24 and an abutment on pin 450 to urge the pin 450 and the head carrying plate 452 downwardly to position the heads 50 and 52 in operative association with a first set of channels in the tape. An adjusting screw 456 extends downwardly through plate 452 and bears against the upper surface of sub-chassis 24, so that the elevation of the plate 452 relative to the sub-chassis 24 may be varied. Thus, when the upper slide 148 is moved forwardly, as by the selection of an Automatic Tape Feed Function, leaf spring 448 moves forwardly and lifts pin 450 and the head carrying plate 452 to the pre-adjusted elevation, where the transducing heads 50 and 52 scan an additional set of channels in the tape. When the upper slide 148 is moved rearwardly, as by the tape reversing means to be hereafter described, spring 454 moves heads 50 and 52 downwardly into operative relationship with the first mentioned set of channels.

The automatic reversing means includes a post 458 (FIGS. 5–7) extending upwardly through an opening 459 (FIG. 2) in the subchassis 24 from a link 462 that is pivoted at 464 to a generally triangularly shaped carrier link 466. Link 466 is pivoted to the main chassis 22 at 468, and a spring 467 is connected between link 466 and the chassis to bias link 466 in a clockwise direction about pivot 468. As can be best seen in FIGS. 5 and 6, link 244 includes cam surfaces 223 and 227 at the lefthand end thereof, and spring 467 biases pivot pin 464 toward engagement with the cam surfaces on link 224. An abutment 469 on link 462 is positioned to be engaged by link 466, and during tape feeding, spring 225 pivots links 224 to a position where spring 467 moves pivot pin 464 to cam surface 223, thereby positioning post 458 rearwardly of the tape path and allowing the tape to be fed freely therealong. When tape feeding is completed, and link 224 pivots in a clockwise direction about pivot 226, the cam surface 223 on link 224 pivots link 464 in a counterclockwise direction about pivot 468 to the position of FIG. 5 to position the post 458 against the tape moving along the tape path. Post 458 is provided with a hook 460 (FIG. 6) that extends generally radially outwardly from one side thereof, and the hook 460 is adapted to catch within a hole that is provided in a portion of leader material adjacent the end of the tape, so that further movement of the tape after the hook 460 is within the hole will pivot the link 462 in a clockwise direction relative to link 466 about pivot 464.

A wire link 470 is connected between a forwarding extending arm 463 of link 462 and a reversing trip member 472 that is mounted at the right side of the main chassis 22 at pivot 474. A spring 476 is connected between link 474 and the main chassis 22 to bias the link 472 in a counterclockwise direction relative to the main chassis 22 and urge a stop portion 504 of link 472 toward a position of engagement with a flange on the chassis. A pin 478 is carried upon a gear 480, which is mounted to a further link 486 at an eccentric pivot 484, and gear 480 has a cam 482 formed integrally thereof. Pin 478 normally rests against member 472, which holds gear 480 in spaced relationship with a gear 45 on capstan 44. Link 486 is secured to the main chassis 22 at pivot 490, and a spring 492 is connected between link 486 and the main chassis to bias the link 486 in a counterclockwise direction about pivot 490 and urge gear 480 toward engagement with a gear 45. A cam follower 494 is pivoted to link 486 at 496, and a spring 498 is connected between link 486 and cam follower 494 to bias the cam follower in a counterclockwise direction about pivot 496 toward engagement with the cam 482. The left-hand end 500 of link 486 is positioned to engage an upwardly extending tab 502 on upper slide 148, so that as gear 480 rotates and cam 482 engages the cam follower 494 to pivot the link 486 in a clockwise direction about pivot 490, the upper slide 148 will be moved rearwardly to the position of FIG. 7, where the detent portion of lever 202 is in detent notch 212, pressure roller 48 is shifted out of engagement with capstan 44, pressure roller 46 is shifted into engagement with capstan 42, transducing heads 50 and 52 are lowered, brake arms 382 and 384 are pivoted to release turntable 112 and to release turntable 114, idler 120 is moved into driving engagement with hub 116, idler 134 is moved away from sleeve 72, and the direction of movement of the tape is reversed. During this latter movement, link 180 pivots lever 154 in a counterclockwise direction to move link 220 to the left, thereby pivoting link 224 in a clockwise direction whereupon pivot 464 moves into engagement with cam surface 227 and spring 467 pivots link 466 in a clockwise direction to move post 458 rearwardly of the tape path. As gear 480 continues to rotate past the position of FIG. 7, pivot 484 begins to move forwardly, and pin 478 moves into engagement with the inclined cam surface 472*a* of link 472. Spring 476 is sufficiently strong to prevent movement of link 472, so that gear 480 is moved out of engagement with gear 45.

Figure 14:
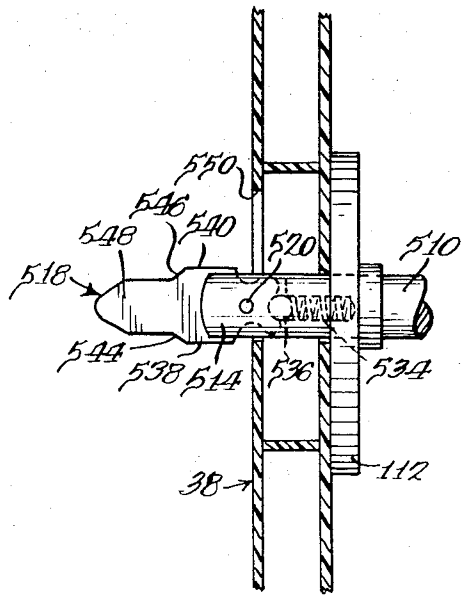
FIG. 14 is a fragmentary section view, taken generally centrally through a tape supply turntable, and illustrating the holddown and keying arrangement of the present invention in a reel or cartridge placement position.
Figure 15:
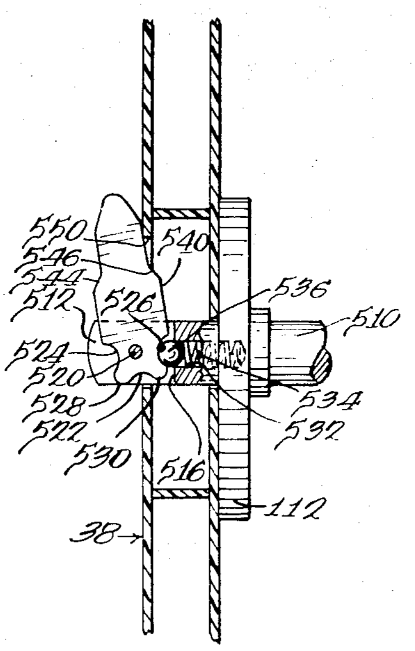
FIG. 15 is a view, similar to FIG. 14 and illustrating the mechanism in a reel retaining and keying position.

The reel or cartridge retaining and driving structure is identical for both turntables, and will be described hereinafter in connection with turntable 112. As is shown in FIGS. 14 and 15, a spindle 510 extends upwardly from turntable 112, and has a bifurcated upper end formed by spaced spindle portions 512 and 514 forming a vertical slot 516 therebetween that receives a retention member 518 therewithin. A pivot pin 520 extends transversely between spindle portions 512 and 514, and through a transverse hole in member 518 to mount member 518 for pivotal movement relative to the spindle 510. Cam surface means is provided at the lower end of member 518, and includes a central recess 522 aligned with pivot pin 520. Lateral recesses 524 and 526 are provided at opposite sides of member 518 to define an enlargement 528 between recesses 522 and 524, and an enlargement 530 between recesses 522 and 526. An upwardly opening bore 532 is provided in spindle 510 and a spring 534 in bore 532 biases a ball 536 upwardly toward engagement with member 518. Member 518 is movable between a first position, shown in FIG. 14, in axial alignment with spindle 510, and when the member 518 is in this position, it will be appreciated that a tape reel may be slidably placed upon the turntable 112 without difficulty.

Member 518 includes lateral offset enlargements 538 and 540 at opposite sides thereof forwardly of recesses 524 and 526, respectively. Inclined surfaces 544 and 546 connect enlarged portions 538 and 540 of member 518 with the narrowed portion 548 at the upper end of the member. The upper end of portion 548 is tapered to facilitate placement of reels over the member 518.

After a reel has been placed on the turntable, member 518 is pivoted out of the position shown in FIG. 14 toward the position shown in FIG. 15, where the enlarged portion 540 is shown in driving and keying relationship with respect to a notch 550 in a tape reel. It will be noted that when the member 519 is in the position of FIG. 15, spring 534 biases the ball 536 onto recess portion 526 to positively retain the member 518 in the driving position. It will be appreciated that if member 518 is pivoted to the left, rather than to the right as shown in FIG. 15, ball 536 will be urged by spring 534 into the recess portion 524 to also positively hold member 518 in its pivoted position. It will be appreciated that if the tape recorder chassis is positioned in a near vertical disposition, the spring biased retention member 518 will positively retain the tape reel against the turntable. When member 518 is pivoted from the position of FIG. 14 toward the position of FIG. 15, if a notch 550 is not positioned in alignment with one of the enlarged portions of member 518, the member 518 will assume a position intermediate those illustrated in FIG. 14 and FIG. 15, with ball 536 having passed over one of the enlargements 528 or 530, and with spring 534 urging the ball toward one of the recess portions 524 and 526. When rotation of the turntable, and spindle is initiated, the enlarged portion of member 518 will slide over the upper surface of the tape reel until it reaches a notch in the reel, at which time the spring 534 will bias the ball into a lateral recess of the member 518 to cause the enlarged portion of member 518 to snap onto the notch in the reel, at which time the reel will be positively keyed to the spindle for rotation therewith.

OPERATION

To operate the tape recorder of the present invention, supply and take-up reels or cartridges are placed on the spindles of turntables 112 and 114, respectively, and spindle members 548 are moved from the position of FIG. 14 toward the position of FIG. 15. Knob 28 is then rotated in a clockwise direction to move control shaft 30 to the automatic tape feed position, and upper slide 148 will be moved forwardly to the position of FIG. 4 to allow spring 146 to move idler 134 into driving engagement with sleeve 72, whereby turntable 114 will be rotated. Rotation of turntable 114 allows the member 548 on the take-up turntable spindle to engage within a radial notch 550 in the take-up reel to thereby positively rotate the take-up reel. Movement of slide 148 to the position of FIG. 4 will also cause the projections 404 and 406 on slide 148 to move into engagement with the brake arms 382 and 384 to pivot the brake arms about pivot 386 and thereby free turntables 112 and 114 for rotation. Movement of the control shaft 30 to the automatic tape feed position moves shifter link 174 to the left, and spring 250 biases arm 244 in a clockwise direction about shaft 238 to bring belt 242 into frictional, feeding engagement with the tape on the tape supply reel. The engagement of the belt 242 with the tape on the tape supply reel will rotate turntable 112, and cause the tape to be fed outwardly therefrom between capstan 42 and pressure roller 46, between transducing heads 50–52 and guide surface 54, to capstan 44 and pressure roller 48. As is evident from FIG. 4, when an automatic tape feed function has been selected, the cam portion 340a of slot 340 in slide 148 allows the pressure roller 48 to move into engagement with the capstan 44, so that when the leading end of the tape, or leader thereon, reaches capstan 44 and pressure roller 48, capstans 44 will positively drive the end of the tape toward the tape take-up reel. Guide finger 58 is pivoted in a counterclockwise direction about pivot 302 as shifter link 174 moves to the actuated or automatic tape feeding position of FIG. 4, and the finger 58 positively deflects the leading end of the tape, or leader thereon, into engagement with the automatic gripping means on the rotating tape take-up reel.

The stop surface 286 on lever 288 engages the abutment 284 on the shifter link 174 to positively retain the shifter link in the actuated position of FIG. 4 until the tape is positively gripped by the take-up reel, at which time the tape will become taut, and pivot tape sensing lever 60. Control link 310 then allows link 288 to pivot and free shifter link 174 for movement to the normal position under the bias of spring 178. When shifter link 174 is in the actuated position of FIG. 4, the connector link 220 allows spring 225 to pivot carrier link 224 in a counterclockwise direction about pivot 226, to bring the gear 229 on pulley 228 mesh with the gear 43 on capstan 42, so that the tape feed-out means 56 will be positively driven. The pivotal movement of link 224 during an automatic tape feed function allows spring 467 to move link 466 and pivot pin 464 to the cam surface 223 of link 224, so that the post 458 is spaced rearwardly of the tape path to allow the tape to move freely outwardly from the tape supply reel. When the shifter link 174 is returned to normal position, post 458 is positioned immediately adjacent the tape path, with the projection 460 on post 458 bearing against the tape, so as to be positioned in tape sensing relationship with the tape reversing indicia carried by the tape.

After the tape feeding function has been completed, pressure pads, not shown, and movable in response to the pivoting of tape sensing lever 60, yieldably press the tape against transducing heads 50 and 52, with the gaps in the heads being positioned in proper scanning relationship with upper tracks in the tape, due to the action of leaf spring 448 on upper slide 148 engaging the lower end of the pin 450 of the vertically movable transducing head assembly. When the projection 460 on post 458 senses the tape reversing information on the tape, lever 462 is pivoted from the position of FIG. 5 to the position of FIG. 6, and connecting link 470 is shifted to the left to move stop surface 477*a* out of engagement with pin 478. This enables spring 492 to move the eccentric gear 480 of the one revolution tape direction reversing mechanism into mesh with the gear 45 on capstan 44. As gear 482 is rotated, lever 486 is pivoted in a clockwise direction about pivot 490 to move the upper slide 148 rearwardly to the position of FIG. 7. When the slide 148 is moved to the position of FIG. 7, slide 354 moves idler 134 out of engagement with sleeve 72, and spring 128 moves idler 122 into engagement with sleeve 72 and turntable 112, so that the turntable 112 is positively driven. At the same time, pressure roller 48 moves away from capstan 44, while pressure roller 46 moves into engagement with capstan 42, so that the tape is positively driven from the take-up reel to the supply reel. Movement of the upper slide to the position of FIG. 7 shifts leaf spring 448 out of engagement with the actuating pin 450 of the transducing head assembly, so that spring 450 moves the gaps of heads 50 and 52 downwardly into proper scanning relationship with respect to the lower tracks in the tape.

After the direction of tape movement is reversed, spring 467 biases carrier link 466 in a clockwise direction above pivot 468 to position the post 458 rearwardly of the tape path, so that the tape can move from right to left, as viewed in FIG. 7, free of engagement with the post 458. During tape reversal, spring 476 pivots link 472 in a counterclockwise direction about pivot 474 to reposition surface 472a in the path of movement of pin 478, so that as one cycle of the one revolution mechanism is completed, gears 478 and 45 will be moved out of engagement with one another.

If a fast forward cycle is desired, control shaft 30 is depressed to position the pin 152 beneath the plane of the lower surface of finger 172, and shaft 30 is rotated in a clockwise direction to move lower slide 150 forwardly. It will be understood, of course, that during selection of a fast wind or a fast rewind cycle, the projections 155 and 157, extending downwardly from opposite side of the rearward end of the slide 150 will engage the brake arms 382 and 384 to pivot the same about pivot 386 to free turntables 112 and 114 for rotation. Furthermore, when either a fast wind or fast rewind cycle is selected, movement of lower slide 150 in either direction pivots link 460 to move tape shifting element 426 forwardly across the tape path so that the tape will be spaced from the transducing heads. During a fast forward cycle, the cam surface 408 on lower slide 150 engages idler shaft 142 to elevate the idler 134 into a position for engagement with the large diameter step 74 of sleeve 72. Furthermore, tab 351 on slide 150 moves slide 354 forwardly during selection of a fast wind cycle, so that spring 146 can move the idler 134 into engagement with the pulley step 74. In a like manner, when a fast rewind cycle has been selected by rotating the depressed shaft 30 in a counterclockwise direction (FIG. 7), idler shaft 124 is lifted by cam surface 410, and spring 128 moves idler 122 into engagement with the large diameter step 74 of sleeve 72.

When either of slides 148 or 150 is moved in either direction during selection of a tape recorder function, the cam surface 442 on slide 150 or the cam surface 446 on slide 148 engages cam follower pin 440 on link 434 to pivot the link 434 in a clockwise direction about pivot 436 to move the abutment 438 on link 434 rearwardly with respect to the automatic shut-off controlling lever 462. When tape is present in the tape path, the tape engaging end 464 of lever 462 will rest upon the tape, and will be positively held thereagainst by the internal bias of switch 458. When tape is no longer present in the tape path, the lever 462 will move from the broken line position of FIG. 13 to the full line position as switch 258 opens to interrupt the circuit of the drive motor 61 to thereby terminate operation of the tape recorder.

If it is desired to change the speed at which capstans 42 and 44 are rotated, shaft 88 is rotated to cause cam 92 to pivot lever 104 about the horizontal axis defined by tabs 102, and the curved, forward portion 106 of lever 104 vertically moves the belt 82 between the steps 68 and 70 of the pulley fixed to the output shaft of motor 61. Spring 100 biases the lower end of detent rod 94 into engagement with cam 92 to releasably retain the belt shifting member 104 in the selected position.

While a preferred embodiment of the invention has been shown and described, it is to be understood that it is capable of many modifications. Changes, therefore, in the construction and arrangement may be made without departing from the spirit and scope of the invention as defined by the appended claims.

We claim:

1. A tape recorder comprising: A frame, a first turntable rotatably mounted on said frame at a tape supply station; a second turntable rotatably mounted on said frame at a tape take-up station; a transducing station on said frame between said tape supply and tape take-up stations and cooperating therewith to define a tape path; rotatable capstan means for moving tape along said tape path from said supply station to said take-up station during a wind operaion and for moving tape along said path and from said take-up station to said supply station during a rewind operation; means for rotating said second turntable during a wind operation and said first turntable during a rewind operation; brake means for stopping said turntables at the end of wind and rewind operations, said brake means including first and second brake arms pivotally connected intermediate their ends to one another and to said frame at a substantially equal distance from said turntables, said first arm having a braking portion at one end thereof adjacent said first turntable and said second arm having a braking portion at one end thereof adjacent said second turntable; means urging said brake arm portions toward braking engagement with said turntables; control means including a first control member movable in a first direction to select a wind operation and in a second direction to select a rewind operation; and brake release means associated with said control member for engaging said brake arms at one side of their pivot connection for pivoting said brake arms relative to one another upon movement of said control member in the first direction and engaging said brake arms at the other side of their pivot mounting for pivoting said brake arms upon movement of said control member in the second direction to move said brake arm portions away from said turntables.

2. A tape recorder as set forth in claim 1 wherein said control means includes a second member movable in a first direction to select a fast wind operation and in a second direction to select a fast rewind operation, said second control member having brake release means thereon for pivoting said brake arms relative to one another upon movement of said second control member in either direction.

3. A tape recorder as set forth in claim 2 wherein said control members are defined by a pair of aligned slides mounted for longitudinal movement with respect to said frame and with respect to one another, each of said slides having projections thereon spaced outwardly of the pivot of said brake arms for moving said brake arms when said slides are moved in either direction.

4. A tape recorder comprising: a frame; a first turntable rotatably mounted on said frame at a tape supply station; a second turntable rotatably mounted on said frame at a tape take-up station; a transducing station on said frame between said tape supply and take-up stations and cooperating therewith to define a tape path; rotatable capstan means for moving tape along said tape path from said supply station to said take-up station during a wind operation and from said take-up station to said supply station during a rewind operation; motor driven means carried by said frame; means for rotating said second turntable during a wind operation including, first support structure mounted for movement relative to said frame, a first drive element rotatably mounted on said support structure, means biasing said support structure to urge said drive element toward said motor driven means; means engageable with said support structure for retaining said drive element spaced from said motor driven means; means for rotating said first turntable during a rewind operation including, second support structure mounted for movement relative to said frame, a second drive element rotatably mounted on said second support structure, means biasing said second support structure to urge said second drive element toward said motor driven means; means engageable with said second support structure for retaining said second drive element spaced from said motor driven means; brake means for stopping said turntables at the end of wind and rewind operations including a pair of brake arms pivotally connected to each other intermediate their ends to each have a free end and define a pair of diverging arm sections at either side of their pivotal connection; control means movable in a first direction to select a wind operation and in a second direction to select a rewind operation; brake release means associated with said control means for releasing said brake means upon movement of said control means in either direction including a pair of operating elements movable with the control means and positioned one between each of said pair of diverging arm sections whereby each of said brake arms is engaged and pivoted in the same direction regardless of the direction of movement of said control means; means responsive to movement of said control means in said first direction for moving said first mentioned retaining means to allow said first drive element to move into engagement with said motor driven means whereby said second turntable is rotated; and means responsive to movement of said control means in said second direction for moving said last-mentioned retaining means to allow said second drive element to move into engagement with said motor driven means whereby said first turntable is rotated.

5. A tape recorder as set forth in claim 4 in which said first mentioned and last mentioned retaining means each include a slide mounted for longitudinal movement on said frame, said slides each having an abutment engageable with its associated support structure; and wherein resilient means is connected between each slide and the frame for urging said abutments against the support structures to retain the drive elements spaced from the motor driven means.

* * * * *